US011661639B2

(12) United States Patent
Wu et al.

(10) Patent No.: US 11,661,639 B2
(45) Date of Patent: May 30, 2023

(54) METHOD FOR WHOLE COMPONENT MICROWAVE FAST DIGESTION AND PRECIOUS METAL EXTRACTION FROM IONIC LIQUID OF WASTE CIRCUIT BOARD

(71) Applicant: BEIJING UNIVERSITY OF TECHNOLOGY, Beijing (CN)

(72) Inventors: Yufeng Wu, Beijing (CN); Jiewen Yan, Beijing (CN); Bin Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/743,385

(22) Filed: May 12, 2022

(65) Prior Publication Data

US 2022/0267879 A1   Aug. 25, 2022

Related U.S. Application Data

(63) Continuation of application No. PCT/CN2020/114544, filed on Sep. 10, 2020.

(30) Foreign Application Priority Data

Jan. 23, 2020 (CN) .......................... 202010076130.9

(51) Int. Cl.
  *C22B 3/00* (2006.01)
  *C22B 11/00* (2006.01)
  (Continued)

(52) U.S. Cl.
  CPC .......... *C22B 23/0461* (2013.01); *C22B 7/007* (2013.01); *C22B 11/046* (2013.01);
  (Continued)

(58) Field of Classification Search
  CPC ... C22B 23/0461; C22B 7/007; C22B 11/046; C22B 15/0071; C22B 15/0089; C22B 23/043
  (Continued)

(56) References Cited

FOREIGN PATENT DOCUMENTS

| CN | 1119554 | 4/1996 |
|---|---|---|
| CN | 103459622 A | 12/2013 |

(Continued)

OTHER PUBLICATIONS

NPL1: "Extraction of Ag and Au from chloride electronic waste leach solutions using ionic liquids", Journal of Environmental Chemical Engineering, vol. 1, No. 7, pp. 1-9, Feb. 28, 2019.

(Continued)

*Primary Examiner* — Melissa S Swain
(74) *Attorney, Agent, or Firm* — J.C. Patents

(57) ABSTRACT

The invention discloses Method for whole component microwave fast digestion and precious metal extraction from ionic liquid of waste circuit board, and belongs to the field of hydrometallurgy. Based on the theory that microwaves can directly penetrate through a leaching medium to directly heat a circuit board, microwave-assisted leaching can reinforce mass transfer and heat transfer in the traditional leaching process, the leaching time is greatly shortened, and the leaching efficiency is improved. Before leaching, a waste circuit board does not need to be smashed, and environmental protection is achieved while energy is saved. The temperature rising process and reaction time of the reaction can be controlled, the whole process is conducted under the airtight condition, heat loss in the leaching process is avoided, the valuable leaching rate is high, the selectivity is high, and efficient leaching of valuable metal can be achieved. Precious metal leachate is extracted through imidazolium ionic liquid, the selectivity of the imidazolium (Continued)

ionic liquid to gold is high, and the co-extraction phenomenon of gold, nickel, copper and other ions is avoided. The method for extracting the precious metal leachate through ionic liquid is a green and clean recycling method, and the overall recycling rate of gold, nickel and copper can reach 99% or above.

4 Claims, 1 Drawing Sheet

(51) Int. Cl.
  *C22B 7/00* (2006.01)
  *C22B 15/00* (2006.01)
(52) U.S. Cl.
  CPC ...... *C22B 15/0071* (2013.01); *C22B 15/0089* (2013.01); *C22B 23/043* (2013.01)
(58) Field of Classification Search
  USPC ........................................................ 75/10.13
  See application file for complete search history.

(56) References Cited

FOREIGN PATENT DOCUMENTS

| CN | 103882231 A | 6/2014 | | |
|---|---|---|---|---|
| CN | 104328281 | 2/2015 | | |
| CN | 104775034 A | 7/2015 | | |
| CN | 105755289 A | 7/2016 | | |
| CN | 106148704 A | 11/2016 | | |
| CN | 109252051 A | 1/2019 | | |
| CN | 109609767 A | 4/2019 | | |
| CN | 110004299 A | 7/2019 | | |
| CN | 110396596 A | * | 11/2019 | |
| CN | 110396596 A | 11/2019 | | |
| CN | 110484724 A | 11/2019 | | |
| CN | 111172400 A | 5/2020 | | |
| WO | WO-2017017647 A1 | * | 2/2017 | ........... C22B 11/046 |

OTHER PUBLICATIONS

NPL2: "Gild Leaching from Printed Circuit Boards of Discarded Mobile Phone by Acidic Thiourea" Mining and Metallurgical Engineering, vol. 35, No. 2, pp. 87-90, Apr. 2015.
NPL3: "Extraction of Gold(III) from Hydrochloric Acid into Various Ionic Liquids: Relationship between Extraction Efficiency and Aqueous Solubility of Ionic Liquids", ACS Sustainable Chemistry & Engineering, vol. 2, No. 4, Apr. 30, 2016.
NPL4: "Research and development of metal ion extraction by ionic liquids", Journal of Shenyang Agriculture University, 2018, 49(4), pp. 498-512.
NPL5: Chemical Engineering Principle (Second Edition), p. 356, edited by Zhicheng He, Aug. 31, 2009.
NPL6: "质谱及其联用技术 在卫生检验中的应用", p. 279, edited by Ke Gao, Jan. 31, 2015.
NPL7: "Extraction Metallurgy", by Rongjun Ma, Aug. 31, 2009, pp. 700-702, 708.
International Search Report of PCT/CN2020/114544.
Search Report of CN2020100761309.
Supplemental Search Report of CN2020100761309.

* cited by examiner

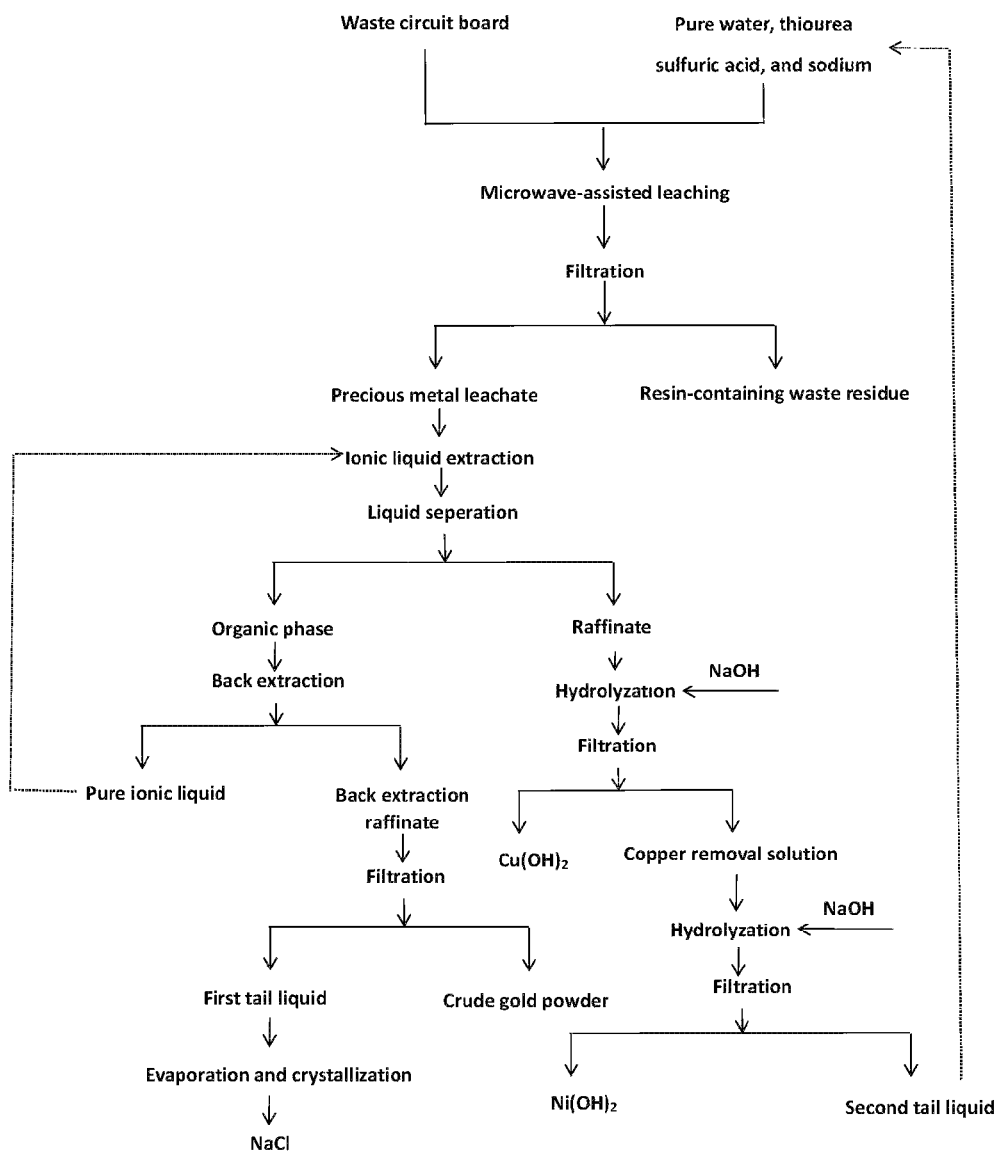

METHOD FOR WHOLE COMPONENT MICROWAVE FAST DIGESTION AND PRECIOUS METAL EXTRACTION FROM IONIC LIQUID OF WASTE CIRCUIT BOARD

CROSS-REFERENCE TO RELATED APPLICATION

This application is a continuation of international application PCT/CN2020/114544 filed on Sep. 10, 2020, which claims the priority benefits to Chinese Patent Application No. 202010076130.9 filed on Jan. 23, 2020, the content of the above identified applications is hereby incorporated by reference in its entirety.

TECHNICAL FIELD

The invention relates to a method for whole component microwave fast digestion and precious metal extraction from ionic liquid of waste circuit board, in particular to a microwave-assisted method for high-efficiency separation of precious metals from waste circuit boards and clean and high-efficiency extraction of ionic liquids.

BACKGROUND ART

In recent years, with population growth, rapid economic growth, continuous technological innovation, improvement of living standards, shortening of the electronic and electrical equipment life, and changes in consumer attitudes, the amount of waste electronic waste that needs to be safely managed has increased significantly. Waste circuit boards are commonly used components of electronic and electrical equipment, and are also the core components of electronic waste. The circuit board is composed of an insulating substrate made of glass fiber and epoxy resin, copper foil for conductive paths, and electronic components soldered on its surface. In order to increase its conductivity, the contacts and special locations are usually plated with precious metals such as gold and nickel to form copper-nickel and gold-nickel alloys. Due to the existence of hazardous substances, the disposal of electronic waste is a serious problem worldwide. The waste circuit board contains about 40% metal, 30% organic resin and 30% ceramic. Among them, there are 100-270 kg copper and 80 g-1 kg gold in an average 1 t circuit board, which has rich resource value. At the same time, a large number of heavy metals and benzene-like toxic and harmful substances with improper handling can produce harmful substances such as dioxins and furans, which seriously endanger the environment and human health, and cause environmental hazards. Therefore, the study of clean and efficient waste circuit board separation and recycling technology has very important practical significance for reducing environmental hazards and improving resource recovery and utilization.

At present, the recycling of waste circuit boards is mainly divided into pyrometallurgical and hydrometallurgical technologies. Among them, pyrometallurgical technology is mainly concentrated on pyrolysis technology. The waste circuit boards are crushed and sent to the reactor for pyrolysis to carbonize the non-metals in them, crush and sort the solid products, and recover metals and non-metals (CN109252051A). Chinese patent CN110004299A discloses a method for comprehensive recovery of waste circuit board pyrolysis polymetallic products. The polymetallic product obtained by pyrolysis of waste circuit board at a certain temperature is added to a smelting furnace for smelting and blending to obtain alloy liquid, and then atomizing it to dissolved in acid solution, and the filtered acid hydrolysis residue is recovered for rare and precious metals. However, due to the strict temperature control of the pyrolysis process and the environmental pollution caused by pyrolysis products such as furan and dioxins, it is difficult to apply. The method of hydrometallurgical recovery of precious metals from waste circuit boards is usually to mechanically crush the waste circuit boards into fine particles, physically separate the metals and precious metals, and select strong oxidizing acids and alkalis (or strong oxidants) to transfer the valuable metal to the solution, after filtration, electrolysis and other technologies are used to obtain precious metals (such as Chinese patent CN104328281A, CN105755289A). The process mainly involves complicated processes and long processes, large amounts of reagents, and more toxic waste liquids.

It can be seen that both pyrometallurgical and hydrometallurgical recycling of valuable metals in waste circuit boards have their advantages and disadvantages. In view of the long process flow and low recycling efficiency of hydrometallurgical recycling circuit boards, there have been studies in recent years to strengthen the use of external auxiliary means. The leaching process makes up for the deficiencies in the hydrometallurgical process. Patent CN109609767A developed an ultrasonic-assisted technology for preferential separation of precious metals based on the characteristics of precious metals existing on the surface of circuit boards.

SUMMARY

The purpose of the present invention is mainly to solve the problems of rapid microwave digestion of whole components of waste circuit boards and extraction of precious metal ionic liquids.

Because microwaves can penetrate the leaching medium and directly heat the circuit board, microwave-assisted leaching can strengthen the mass and heat transfer in traditional leaching process, greatly shorten the leaching time and improve the leaching efficiency. There is no need to crush waste circuit boards before leaching, which saves energy and protects the environment. The reaction can control its heating process and reaction time. The whole process is carried out under closed conditions to avoid heat loss during the leaching process. The valuable leaching rate is high, the selectivity is strong, and the efficient leaching of valuable metals can be realized.

The precious metal leaching solution is extracted with imidazole ionic liquid, which has strong selectivity to gold, and there is no co-extraction phenomenon with nickel and copper ions. As a new type of extractant, compared with traditional organic extractants, it has the advantages of non-volatile, high ignition point, wide liquid range, stable physical and chemical properties, etc. The extraction of precious metal leachate by ionic liquid is a clean and green recovery method.

The method for whole component microwave fast digestion and precious metal extraction from ionic liquid of waste circuit board including the following steps:

(1) Pretreatment of waste circuit boards: cut the waste circuit boards into small pieces, each weighing between 0.1 g and 0.2 g, to obtain the waste circuit boards to be leached.

(2) Configuration of precious metal leaching solution for waste circuit boards: add pure water, thiourea, sulfuric acid, and sodium peroxide to the beaker, and stir quickly until all are dissolved to obtain the leaching solution. The concentration of the extract is: thiourea: 1.5-4 mol/L, sulfuric acid 0.5-2 mol/L, sodium peroxide 1-3 mol/L.

(3) Microwave-assisted leaching of waste circuit boards: put the pretreatment circuit boards in the digestion tank, and pour the leaching solution into the digestion tank at the same time, the heating time of microwave digestion instrument is set to 1-1.5 h, heating temperature of microwave digestion instrument is set to 180-200° C. with 20 min insulation, cooling time of microwave digestion instrument is set to 15-30 min, cool down to 60° C. to obtain precious metal leachate and resin-containing waste residue.

(4) After filtration, place the precious metal leachate in step (3) in the extraction tank, add imidazole ionic liquid [BMIM][NTF2] (1-butyl-3-methylimidazole bistrifluoromethylsulfonimide) according to the volume ratio of the ionic liquid to the precious metal leachate is 1:1 to 1:5, and fully stir for 5 to 15 minutes to make oil and liquid phases are thoroughly mixed. The obtained mixed phase is centrifuged and separated to obtain an organic phase and a raffinate.

(5) Add oxalic acid solution to the organic phase obtained in step (4) according to the volume ratio of the organic phase to the oxalic acid solution is 1:1 to 1:10, the concentration of the oxalic acid solution is 1-3 mol/L, and back extraction is performed. Stirred for 5-15 minutes to make the oil and liquid phase fully mixed. After centrifuging and separating the obtained mixed phase, a back extraction raffinate and a pure ionic liquid are obtained. The organic phase ionic liquid is recycled to step (4) to repeat the extraction.

(6) The back extraction raffinate in step (5) is filtered to obtain the first tail liquid and crude gold powder. The first tail liquid undergoes evaporation and crystallization to recover sodium chloride.

(7) Precious metal separation of raffinate: add sodium hydroxide to the raffinate obtained in step (4), adjust the pH to 6.7-7.0, undergoes hydrolyze precipitation and filtration to obtain copper hydroxide precipitation and copper removal solution; add solids sodium hydroxide to the copper removal solution, adjust the pH to 9.5-10.0, process hydrolyze the precipitation and filtration to obtain nickel hydroxide precipitate and second tail liquid.

(8) Treatment of second tail liquid: add sulfuric acid, thiourea, and sodium peroxide to the second tail liquid obtained in step (7) to make the sulfuric acid, thiourea, and sodium peroxide in the second tail liquid meet the concentration standard of the leaching solution in step (2), repeat for many times until the sulfate reaches saturation, then, the second tail liquid does not return to the leaching process.

The beneficial effects of this invention are as follow:

The microwave-assisted leaching process can control the heating process and reaction time. The whole process is carried out under closed conditions to avoid heat loss during the leaching process. The valuable leaching has high leaching rate and strong selectivity, which can realize the efficient leaching of valuable metals. The ionic liquid extraction process has strong selectivity to gold, and there is no co-extraction phenomenon with nickel and copper ions. As a new type of extractant, compared with traditional organic extractants, it has the advantages of non-volatile, high ignition point, wide liquid range, stable physical and chemical properties, and strong extraction capacity. In the overall recovery process, the recovery rate of gold is as high as 98.5%, nickel is as high as 99%, and copper is as high as 99.5%. The tail liquid can be recycled, and the extraction reagents leached in the process are green and clean, without secondary pollution, and are environmentally friendly.

DESCRIPTION OF THE DRAWINGS

FIG. 1 shows the flowchart of a technical scheme of the invention.

PREFERRED EMBODIMENTS

Embodiment 1

Cut the waste circuit boards into small pieces, each weighing between 0.1 g, to obtain the waste circuit boards to be leached. Add pure water, thiourea, sulfuric acid, and sodium peroxide to the beaker, and stir quickly until all are dissolved to obtain the leaching solution. The concentration of the extract is: thiourea: 1.5 mol/L, sulfuric acid 1.5 mol/L, sodium peroxide 2 mol/L. Put the pretreatment circuit boards in the digestion tank, and pour the leaching solution into the digestion tank at the same time, the heating time of microwave digestion instrument is set to 1 h, heating temperature of microwave digestion instrument is set to 185° C. with 20 min insulation, cooling time of microwave digestion instrument is set to 15 min, cool down to 60° C. and process filtration to obtain precious metal leachate and resin-containing waste residue. Place the precious metal leachate in the extraction tank, add imidazole ionic liquid [BMIM][NTF2] according to the volume ratio of the ionic liquid to the precious metal leachate is 1:1, and fully stir for 5 min to make oil and liquid phases are thoroughly mixed. The obtained mixed phase is centrifuged and separated to obtain an organic phase and a raffinate. Add oxalic acid solution to the organic phase according to the volume ratio of the organic phase to the oxalic acid solution is 1:2, the concentration of the oxalic acid solution is 1.5 mol/L, and back extraction is performed. Stirred for 10 min to make the oil and liquid phase fully mixed. After centrifuging and separating the obtained mixed phase, a back extraction raffinate and a pure ionic liquid are obtained. The organic phase ionic liquid is recycled to repeat the extraction.

The back extraction raffinate is filtered to obtain the first tail liquid and crude gold powder. The first tail liquid undergoes evaporation and crystallization to recover sodium chloride. Add sodium hydroxide to the raffinate, adjust the pH to 6.7, undergoes hydrolyze precipitation and filtration to obtain copper hydroxide precipitation and copper removal solution; add solids sodium hydroxide to the copper removal solution, adjust the pH to 9.6, process hydrolyze the precipitation and filtration to obtain nickel hydroxide precipitate and second tail liquid. Add sulfuric acid, thiourea, and sodium peroxide to the second tail liquid to make the sulfuric acid, thiourea, and sodium peroxide in the second tail liquid meet the concentration standard of the leaching solution, then returns to configure the precious metal leaching solution. The recovery rate of gold, nickel and copper reaches 99.0%, 99.5% and 99.3% respectively.

Embodiment 2

Cut the waste circuit boards into small pieces, each weighing between 0.15 g, to obtain the waste circuit boards to be leached. Add pure water, thiourea, sulfuric acid, and sodium peroxide to the beaker, and stir quickly until all are dissolved to obtain the leaching solution. The concentration of the extract is: thiourea: 2 mol/L, sulfuric acid 1.8 mol/L, sodium peroxide 1.5 mol/L. Put the pretreatment circuit boards in the digestion tank, and pour the leaching solution into the digestion tank at the same time, the heating time of microwave digestion instrument is set to 1.2 h, heating temperature of microwave digestion instrument is set to 180° C. with 20 min insulation, cooling time of microwave digestion instrument is set to 25 min, cool down to 60° C. and process filtration to obtain precious metal leachate and resin-containing waste residue. Place the precious metal leachate in the extraction tank, add imidazole ionic liquid [BMIM][NTF2] according to the volume ratio of the ionic liquid to the precious metal leachate is 1:2, and fully stir for 8 min to make oil and liquid phases are thoroughly mixed. The obtained mixed phase is centrifuged and separated to obtain an organic phase and a raffinate. Add oxalic acid solution to the organic phase according to the volume ratio of the organic phase to the oxalic acid solution is 1:5, the concentration of the oxalic acid solution is 2 mol/L, and back extraction is performed. Stirred for 12 min to make the oil and liquid phase fully mixed. After centrifuging and separating the obtained mixed phase, a back extraction raffinate and a pure ionic liquid are obtained. The organic phase ionic liquid is recycled to repeat the extraction. The back extraction raffinate is filtered to obtain the first tail liquid and crude gold powder. The first tail liquid undergoes evaporation and crystallization to recover sodium chloride. Add sodium hydroxide to the raffinate, adjust the pH to 6.9, undergoes hydrolyze precipitation and filtration to obtain copper hydroxide precipitation and copper removal solution; add solids sodium hydroxide to the copper removal solution, adjust the pH to 9.5, process hydrolyze the precipitation and filtration to obtain nickel hydroxide precipitate and second tail liquid. Add sulfuric acid, thiourea, and sodium peroxide to the second tail liquid to make the sulfuric acid, thiourea, and sodium peroxide in the second tail liquid meet the concentration standard of the leaching solution, then returns to configure the precious metal leaching solution. The recovery rate of gold, nickel and copper reaches 99.6%, 99.2% and 99.5% respectively.

Embodiment 3

Cut the waste circuit boards into small pieces, each weighing between 0.18 g, to obtain the waste circuit boards to be leached. Add pure water, thiourea, sulfuric acid, and sodium peroxide to the beaker, and stir quickly until all are dissolved to obtain the leaching solution. The concentration of the extract is: thiourea: 3.5 mol/L, sulfuric acid 2 mol/L, sodium peroxide 2.5 mol/L. Put the pretreatment circuit boards in the digestion tank, and pour the leaching solution into the digestion tank at the same time, the heating time of microwave digestion instrument is set to 1.5 h, heating temperature of microwave digestion instrument is set to 190° C. with 20 min insulation, cooling time of microwave digestion instrument is set to 20 min, cool down to 60° C. and process filtration to obtain precious metal leachate and resin-containing waste residue. Place the precious metal leachate in the extraction tank, add imidazole ionic liquid [BMIM][NTF2] according to the volume ratio of the ionic liquid to the precious metal leachate is 1:3, and fully stir for 12 min to make oil and liquid phases are thoroughly mixed. The obtained mixed phase is centrifuged and separated to obtain an organic phase and a raffinate. Add oxalic acid solution to the organic phase according to the volume ratio of the organic phase to the oxalic acid solution is 1:8, the concentration of the oxalic acid solution is 2.8 mol/L, and back extraction is performed. Stirred for 12 min to make the oil and liquid phase fully mixed. After centrifuging and separating the obtained mixed phase, a back extraction raffinate and a pure ionic liquid are obtained. The organic phase ionic liquid is recycled to repeat the extraction. The back extraction raffinate is filtered to obtain the first tail liquid and crude gold powder. The first tail liquid undergoes evaporation and crystallization to recover sodium chloride. Add sodium hydroxide to the raffinate, adjust the pH to 6.8, undergoes hydrolyze precipitation and filtration to obtain copper hydroxide precipitation and copper removal solution; add solids sodium hydroxide to the copper removal solution, adjust the pH to 9.9, process hydrolyze the precipitation and filtration to obtain nickel hydroxide precipitate and second tail liquid. Add sulfuric acid, thiourea, and sodium peroxide to the second tail liquid to make the sulfuric acid, thiourea, and sodium peroxide in the second tail liquid meet the concentration standard of the leaching solution, then returns to configure the precious metal leaching solution. The recovery rate of gold, nickel and copper reaches 99.7%, 99.4% and 99.6% respectively.

Embodiment 4

Cut the waste circuit boards into small pieces, each weighing between 0.2 g, to obtain the waste circuit boards to be leached. Add pure water, thiourea, sulfuric acid, and sodium peroxide to the beaker, and stir quickly until all are dissolved to obtain the leaching solution. The concentration of the extract is: thiourea: 3.8 mol/L, sulfuric acid 1.6 mol/L, sodium peroxide 2.8 mol/L. Put the pretreatment circuit boards in the digestion tank, and pour the leaching solution into the digestion tank at the same time, the heating time of microwave digestion instrument is set to 1.2 h, heating temperature of microwave digestion instrument is set to 195° C. with 20 min insulation, cooling time of microwave digestion instrument is set to 25 min, cool down to 60° C. and process filtration to obtain precious metal leachate and resin-containing waste residue. Place the precious metal leachate in the extraction tank, add imidazole ionic liquid [BMIM][NTF2] according to the volume ratio of the ionic liquid to the precious metal leachate is 1:4, and fully stir for 15 min to make oil and liquid phases are thoroughly mixed. The obtained mixed phase is centrifuged and separated to obtain an organic phase and a raffinate. Add oxalic acid solution to the organic phase according to the volume ratio of the organic phase to the oxalic acid solution is 1:10, the concentration of the oxalic acid solution is 2.5 mol/L, and back extraction is performed. Stirred for 15 min to make the oil and liquid phase fully mixed. After centrifuging and separating the obtained mixed phase, a back extraction raffinate and a pure ionic liquid are obtained. The organic phase ionic liquid is recycled to repeat the extraction. The back extraction raffinate is filtered to obtain the first tail liquid and crude gold powder. The first tail liquid undergoes evaporation and crystallization to recover sodium chloride. Add sodium hydroxide to the raffinate, adjust the pH to 7.0, undergoes hydrolyze precipitation and filtration to obtain copper hydroxide precipitation and copper removal solution; add solids sodium hydroxide to the copper removal solution, adjust the pH to 9.8, process hydrolyze the precipitation and filtration to obtain nickel hydroxide precipitate and second tail liquid. Add sulfuric acid, thiourea, and sodium peroxide to the second tail liquid to make the sulfuric acid, thiourea, and sodium peroxide in the second tail liquid meet the concentration standard of the leaching solution, then returns to configure the precious metal leaching solution. The recovery rate of gold, nickel and copper reaches 99.9%, 99.1% and 99.5% respectively.

Embodiment 5

Cut the waste circuit boards into small pieces, each weighing between 0.18 g, to obtain the waste circuit boards to be leached. Add pure water, thiourea, sulfuric acid, and sodium peroxide to the beaker, and stir quickly until all are dissolved to obtain the leaching solution. The concentration of the extract is: thiourea: 3.2 mol/L, sulfuric acid 1.2 mol/L, sodium peroxide 3.0 mol/L. Put the pretreatment circuit boards in the digestion tank, and pour the leaching solution into the digestion tank at the same time, the heating time of microwave digestion instrument is set to 1.3 h, heating temperature of microwave digestion instrument is set to 200° C. with 20 min insulation, cooling time of microwave digestion instrument is set to 30 min, cool down to 60° C. and process filtration to obtain precious metal leachate and resin-containing waste residue. Place the precious metal leachate in the extraction tank, add imidazole ionic liquid [BMIM][NTF2] according to the volume ratio of the ionic liquid to the precious metal leachate is 1:5, and fully stir for 10 min to make oil and liquid phases are thoroughly mixed. The obtained mixed phase is centrifuged and separated to obtain an organic phase and a raffinate. Add oxalic acid solution to the organic phase according to the volume ratio of the organic phase to the oxalic acid solution is 1:8, the concentration of the oxalic acid solution is 3.0 mol/L, and back extraction is performed. Stirred for 12 min to make the oil and liquid phase fully mixed. After centrifuging and separating the obtained mixed phase, a back extraction raffinate and a pure ionic liquid are obtained. The organic phase ionic liquid is recycled to repeat the extraction. The back extraction raffinate is filtered to obtain the first tail liquid and crude gold powder. The first tail liquid undergoes evaporation and crystallization to recover sodium chloride. Add sodium hydroxide to the raffinate, adjust the pH to 6.8, undergoes hydrolyze precipitation and filtration to obtain copper hydroxide precipitation and copper removal solution; add solids sodium hydroxide to the copper removal solution, adjust the pH to 10.0, process hydrolyze the precipitation and filtration to obtain nickel hydroxide precipitate and second tail liquid. Add sulfuric acid, thiourea, and sodium peroxide to the second tail liquid to make the sulfuric acid, thiourea, and sodium peroxide in the second tail liquid meet the concentration standard of the leaching solution, then returns to configure the precious metal leaching solution. The recovery rate of gold, nickel and copper reaches 99.5%, 99.4% and 99.7% respectively.

We claim:

1. A method for whole component microwave fast digestion and precious metal extraction from ionic liquid of waste circuit board, the method comprising the following steps:
   (1) pretreatment of waste circuit boards: cut waste circuit boards into pieces to obtain the waste circuit boards to be leached;
   (2) configuration of precious metal leaching solution for waste circuit boards: add pure water, thiourea, sulfuric acid, and sodium peroxide to a beaker, and stir until all are dissolved to obtain a leaching solution; a concentration of the leaching solution is: thiourea 1.5-4 mol/L, sulfuric acid 0.5-2 mol/L, sodium peroxide 1-3 mol/L;
   (3) microwave-assisted leaching of waste circuit boards: put the pretreatment circuit boards in a digestion tank, and pour the leaching solution into the digestion tank at the same time, heating time of a microwave digestion instrument is set to 1-1.5 h, heating temperature of the microwave digestion instrument is set to 180-200° C. with 20 min insulation, cooling time of the microwave digestion instrument is set to 15-30 min, cool down to 60° C. to obtain precious metal leachate and resin-containing waste residue;
   (4) conduct filtration and, after filtration, place the precious metal leachate in step (3) in an extraction tank, add imidazole ionic liquid [BMIM][NTF2] according to a volume ratio of the imidazole ionic liquid to the precious metal leachate of 1:1 to 1:5, and fully stir for 5 to 15 minutes to make a first oil phase and a first liquid phase thoroughly mixed to obtain a first mixed phase; the first mixed phase is centrifuged and separated to obtain an organic phase and a raffinate;
   (5) add an oxalic acid solution to the organic phase obtained in step (4) according to a volume ratio of the organic phase to the oxalic acid solution of 1:1 to 1:10, a concentration of the oxalic acid solution is 1-3 mol/L, and back extraction is performed; stir for 5-15 minutes to make a second oil phase and a second liquid phase fully mixed to obtain a second mixed phase; after centrifuging and separating the second mixed phase, a back extraction raffinate and a pure ionic liquid are obtained;
   (6) the back extraction raffinate in step (5) is filtered to obtain first tail liquid and crude gold powder;
   (7) precious metal separation of raffinate: add sodium hydroxide to the raffinate obtained in step (4), adjust the pH to 6.7-7.0, conduct hydrolyzation, precipitation and filtration to obtain copper hydroxide precipitation and copper removal solution; add solids sodium hydroxide to the copper removal solution, adjust the pH to 9.5-10.0, conduct hydrolyzation, precipitation and filtration to obtain nickel hydroxide precipitate and second tail liquid.

2. A method for whole component microwave fast digestion and precious metal extraction from ionic liquid of waste circuit board according to claim 1, wherein the pure ionic liquid obtained in step (5) is recycled to step (4) to repeat step (4).

3. A method for whole component microwave fast digestion and precious metal extraction from ionic liquid of waste circuit board according to claim 1, wherein the first tail liquid obtained in step (6) undergoes evaporation and crystallization to recover sodium chloride.

4. A method for whole component microwave fast digestion and precious metal extraction from ionic liquid of waste circuit board according to claim 1, wherein sulfuric acid, thiourea, and sodium peroxide are added to the second tail liquid obtained in step (7) to make the sulfuric acid, thiourea, and sodium peroxide in the second tail liquid meet the concentration standard of the leaching solution in step (2), repeat until the sulfate reaches saturation, then, the second tail liquid does not return to the leaching process.

* * * * *